US005702806A

United States Patent [19]

O'Dell et al.

[11] Patent Number: 5,702,806

[45] Date of Patent: Dec. 30, 1997

[54] DECORATIVE LAMINATE SURFACE LAYER

[76] Inventors: Robin D. O'Dell, 1372 Water Oak Point; Joseph Lex, 8304 Laioo Ct., both of Pasadena, Md. 21122

[21] Appl. No.: 599,705

[22] Filed: Apr. 25, 1996

Related U.S. Application Data

[60] Division of Ser. No. 451,978, May 26, 1995, which is a continuation-in-part of Ser. No. 731,981, Jul. 18, 1991, Pat. No. 5,266,384.

[51] Int. Cl.[6] ................................ B32B 3/00; B32B 5/16; B32B 7/00

[52] U.S. Cl. .......................... 428/206; 428/207; 428/208; 428/323; 428/325; 428/328; 428/331; 428/423.1; 428/413; 428/502; 428/522

[58] Field of Search ................................ 428/423.1, 413, 428/323, 325, 328, 231, 480, 206, 207, 502, 208, 522

[56] References Cited

U.S. PATENT DOCUMENTS

| | | | |
|---|---|---|---|
| Re. 30,233 | 3/1980 | Lane | 428/207 |
| Re. 31,373 | 9/1983 | Ungar | 156/222 |
| Re. 32,152 | 5/1986 | Scher | 428/148 |
| 2,837,457 | 6/1958 | Baxter | 156/230 |
| 2,936,814 | 2/1960 | Yakubik | 264/396 |
| 3,135,643 | 5/1964 | Michl | 428/211 |
| 3,540,978 | 10/1970 | Ames | 428/325 |
| 3,639,191 | 2/1972 | Bäder et al. | 156/278 |
| 3,661,673 | 5/1972 | Merriam | 156/279 |
| 3,968,291 | 7/1976 | Chevallier | 428/203 |
| 3,975,572 | 8/1976 | Power | 428/452 |
| 4,044,185 | 8/1977 | McCaskey | 428/153 |
| 4,109,043 | 8/1978 | Delapp | 428/206 |
| 4,112,169 | 9/1978 | Huffman | 428/206 |
| 4,255,480 | 3/1981 | Scher | 428/208 |
| 4,311,757 | 1/1982 | Raghava | 428/323 |
| 4,322,468 | 3/1982 | Raghava | 428/204 |
| 4,374,886 | 2/1983 | Raghava | 428/172 |
| 4,376,812 | 3/1983 | West | 428/165 |
| 4,395,452 | 7/1983 | Scher | 428/148 |
| 4,400,423 | 8/1983 | Scher et al. | 428/204 |
| 4,473,613 | 9/1984 | Jaisle | 428/220 |
| 4,499,137 | 2/1985 | McCaskey | 220/4 |
| 4,532,170 | 7/1985 | O'Dell | 428/143 |
| 4,567,087 | 1/1986 | O'Dell | 428/211 |
| 4,713,138 | 12/1987 | Ungar | 156/307.4 |
| 4,713,299 | 12/1987 | Taylor | 428/526 |
| 4,726,986 | 2/1988 | Cannady | 442/126 |
| 4,765,858 | 8/1988 | Vankerckhoven | 156/235 |
| 5,266,384 | 11/1993 | O'Dell | 428/207 |
| 5,344,704 | 9/1994 | O'Dell et al. | 428/323 |

FOREIGN PATENT DOCUMENTS

| | | |
|---|---|---|
| 454328 | 1/1949 | Canada . |
| 0 122 396 | 10/1984 | European Pat. Off. . |
| 122396 | 10/1984 | European Pat. Off. . |
| 189 070 | 7/1986 | European Pat. Off. . |
| 53-56268 | 5/1978 | Japan . |
| 217825 | 3/1990 | New Zealand . |
| 242905 | 4/1994 | New Zealand . |
| 260908 | 6/1995 | New Zealand . |
| 907 674 | 10/1962 | United Kingdom . |
| 1 238 735 | 7/1971 | United Kingdom . |
| 1 198 154 | 1/1978 | United Kingdom . |
| WO A 91 12146 | 8/1991 | WIPO . |
| WO A 93 01935 | 2/1993 | WIPO . |

OTHER PUBLICATIONS

McGraw-Hill, Dictionary of Scientific & Technical Terms, 3rd Ed., p. 801.

Modern Plastics Encyclopedia, Mid-October, 1989, p. 158, 354.

Phenolic Resins, Robitschek et al., 1950, p. 5, 218.

(List continued on next page.)

*Primary Examiner*—Leszek Kiliman

[57] ABSTRACT

A decorative laminate surface layer composition is prepared by selectively applying dissimilar thermoset or thermoplastic polymers to a decorative laminate facing sheet to achieve a brillant visual or pearlescent appearance.

19 Claims, 6 Drawing Sheets

OTHER PUBLICATIONS

L.G. Plotkin, Process and Equipment for Impregnation of Paper With Polymers. Lesnaya Promyshlennost Publishing House, Moscow, pp. 103–107, 1975. (English Translation).

Ermilov, P.I., Indeikin, E.A. and Tolmachev, I.A. Pigments and Pigmented Varnish–And–Paint Materials. L. Khimiya Publishers, Leningrad, pp. 127–128, 1978. (English Translation).

DECORATIVE LAMINATE SURFACE LAYER

This is a divisional of copending application Ser. No. 08/451,978 filed on May 26, 1995, now pending which is a continuation-in-part of application Ser. No. 07/731,981 filed on Jul. 18, 1991 now U.S. Pat. No. 5,266,384.

FIELD OF THE INVENTION

The present invention relates to processes for achieving decorative laminates having a surface coating of dissimilar resins. The laminates are suitable for counter tops, wall panels, floor surfacing, tabletops and the like.

BACKGROUND

Decorative laminates have been conventionally made by stacking a plurality of layers of paper impregnated with thermosetting resins. Conventional laminates are made of three essential layers: a core layer, a decorative layer, and surface layer. The core or backing layer constitutes a bottom or supporting layer onto which the other layers are bonded. In high pressure laminates, the core layer consists of a plurality of core sheets (for example, three to eight) made from phenolic resin impregnated cellulosic sheets such as kraft paper. Upon the core layers lies a decor sheet impregnated with melamine resin or some other desired impregnating resin such as phenolic, amino, epoxy, polyester, silicone, acrylic and diallyl phthalate resins to name but a few. In low pressure laminates the core layer is more often a sheet of particle board, normally in the range of ⅜ inch to 1 inch thick. It is possible for the core layer for either high or low pressure laminates to made from materials other than paper or particle board, such as cloth (e.g. linen or canvas), wood or mat materials.

The type of decor sheet or decorative facing is dictated by the ultimate product and can be a paper, cardboard, fabric (either woven or felt), or any fibrous or cellulosic fiber decorative sheet, such as viscose rayon fiber or wood pulp fibers of high alpha cellulose content, or other decorative material that would provide a desired aesthetic appearance which are well known in the art.

An overlay sheet is provided on top of the decor sheet which, in the laminate, is essentially transparent and provides protection for the decor sheet.

Improvements of this process are disclosed in Scher et. al. U.S. Pat. Nos. 4,255,480; 4,263,081; 4,327,141; 4,395,452; 4,400,423; Re. No. 32,152; Ungar et. al. U.S. Pat. No. 4,713,138; and O'Dell et al. U.S. Pat. No. 4,567,087. These patents are commonly assigned herewith and their disclosures are incorporated by reference herein.

Scher et. al. U.S. Pat. No. Re. 32,152 teaches that compositions containing small mineral particles, which when coated without resin over unimpregnated printed paper, provide surprising and unexpected properties permitting such paper to be used in the preparation of decorative laminates without an overlay sheet. The resultant laminates are highly abrasion resistant and have enhanced wearability in that they exhibit an initial wear point that equals or exceeds that of conventional laminates with an overlay sheet.

This Scher coating composition is composed of a mixture of small particles of alumina or other abrasion resistant particles of average 20–50 micron particle size, and a lesser amount of micro-crystalline cellulose particles, both dispersed in a stable, aqueous slurry. The particles of alumina, of small size such that they do not interfere with the visual effects in the final product, serve as the abrasion resistant material and the micro-crystalline cellulose particles serve as the preferred temporary binder. Scher further teaches that the binder must be compatible with the resin system later utilized in the laminating procedure, usually melamine resin or in the case of certain low-pressure laminates a polyester resin system, and the micro-crystalline cellulose serves this function as well as stabilizing the small particles of alumina of the surface of the print sheet.

Ungar et. al. U.S. Pat. No. 4,713,138 teaches the process of depositing onto the surface of a decor sheet an ultra-thin layer of abrasion resistant material, which material is substantially disclosed in U.S. Pat. No. 4,255,480, simultaneously with the complete resin saturation of the decor sheet in a single step operation. The resin composition of the Ungar process acts as the carrier for the abrasion resistant material. The abrasion resistant composition consists essentially of an abrasion resistant hard mineral of fine particle size, preferably about 20–50 microns, in quantities sufficient to provide an abrasion resistant layer without interfering with visibility. The abrasion resistant mineral in Ungar is preferably alumina, silica or a mixture thereof. Ungar further teaches the use of a binder material for such mineral. The binder material in Ungar is present in an amount sufficient to bind the abrasion resistant mineral to the surface of the decor sheet. Such binder material is preferably a mixture of micro-crystalline cellulose with a minor amount carboxy methyl cellulose.

One such binder sold by FMC Corporation under the trademark "AVICEL" is a mixture of approximately 89% micro-crystalline cellulose and 11% carboxy methyl cellulose. The abrasion resistant composition suitably contains 1–8 parts by weight of "Avicel" to 4–32 parts by weight of mineral particles preferably at a ratio of mineral particles to binder material of 4:1 to 1:2, and a quantity of 1 part of "AVICEL" per 2 parts of mineral particles has been found to be particularly suitable.

Ungar et. al. also teaches that small additional quantities of carboxymethyl cellulose and a small quantity of silane may be added to the composition. Also, it is preferable to include a small quantity of surfactant, as disclosed in U.S. Pat. No. 4,255,480, and a small quantity of solid lubricant to provide scuff resistance, as disclosed in U.S. Pat. No. 4,567,087 in those compositions.

Accordingly, the above discussed patents provide single and two stage processes for providing a thin or ultra thin abrasion resistant laminate surface applied to decor sheets. However, it has been a continuing problem in the industry to provide a chemical, stain and abrasion resistant laminate surface on a decor sheet suitable for horizontal surfaces having certain brilliant visual appearance such as a pearlescent effect.

While considerable activity in the field has led to many decorative surface appearances, these activities resulted in the development of processes and compositions wherein the resin material was impregnated into the structure of the paper and the thin or ultra-thin layers of the laminate resin were deposited on the surface. The prior processes have failed to achieve laminate which meet all the international standards for horizontal laminate surfaces while retaining brilliant visual effects and none have achieved a laminate having a pearlescent finish that is suitable for horizontal surfaces.

SUMMARY OF THE INVENTION

It is an object of this invention to provide products and methods for producing products which overcome the above mentioned problems encountered in this field.

It is a particular object to provide a laminate surface layer composition including a two layer coating of at least two dissimilar resin polymers to achieve desirable wearability, and chemical, thermal, resistance to ultra-violet radiation, as well as resistance to abrasion, while achieving a brilliant visual decorative appearance of the laminate surface layer. This brilliant visual appearance is remarkable for its rich depth of color and luster. The laminate surface coating of this invention is "ultra thin", (i.e. up to 0.3 mils thick) as defined for the abrasion-resistant coating of the aforementioned Scher et al. U.S. Pat. No. Re. 32,152, except that the presence of mineral particles is optional in the present invention.

A further object of the present invention is to obtain a true pearlescent appearance in a laminate. The results of this invention are very surprising as the resins used in this invention have long been known in the laminates field. In addition to providing these products, it is yet another object of this invention to provide processes for achieving these laminates.

These and other objects of the invention are achieved by applying a surface coating of a liquid or particulate resin onto a conventional decorative facing sheet (including prints, solids, foils and those having a pearlescent ink on an exterior surface, etc.) made from any type of desirable material such as paper, fabrics, wood or other cellulosic material. The surface coating resin may be applied as a liquid dispersion of multiple dissimilar polymers, such as a colloid, a mixture of polymer particles suspended in a liquid resin, an emulsion, or an aqueous dispersion of polymer particles in water. Exemplary of suitable polymer particles for use herein are polyester, polyurethane, polyvinyl chloride, epoxy, and acrylic, or mixtures thereof. For purposes of this invention the term "particles" or "particulates" is not limited to those materials which are solid at room temperatures.

DETAILED DESCRIPTION OF EMBODIMENTS

Figure 1:
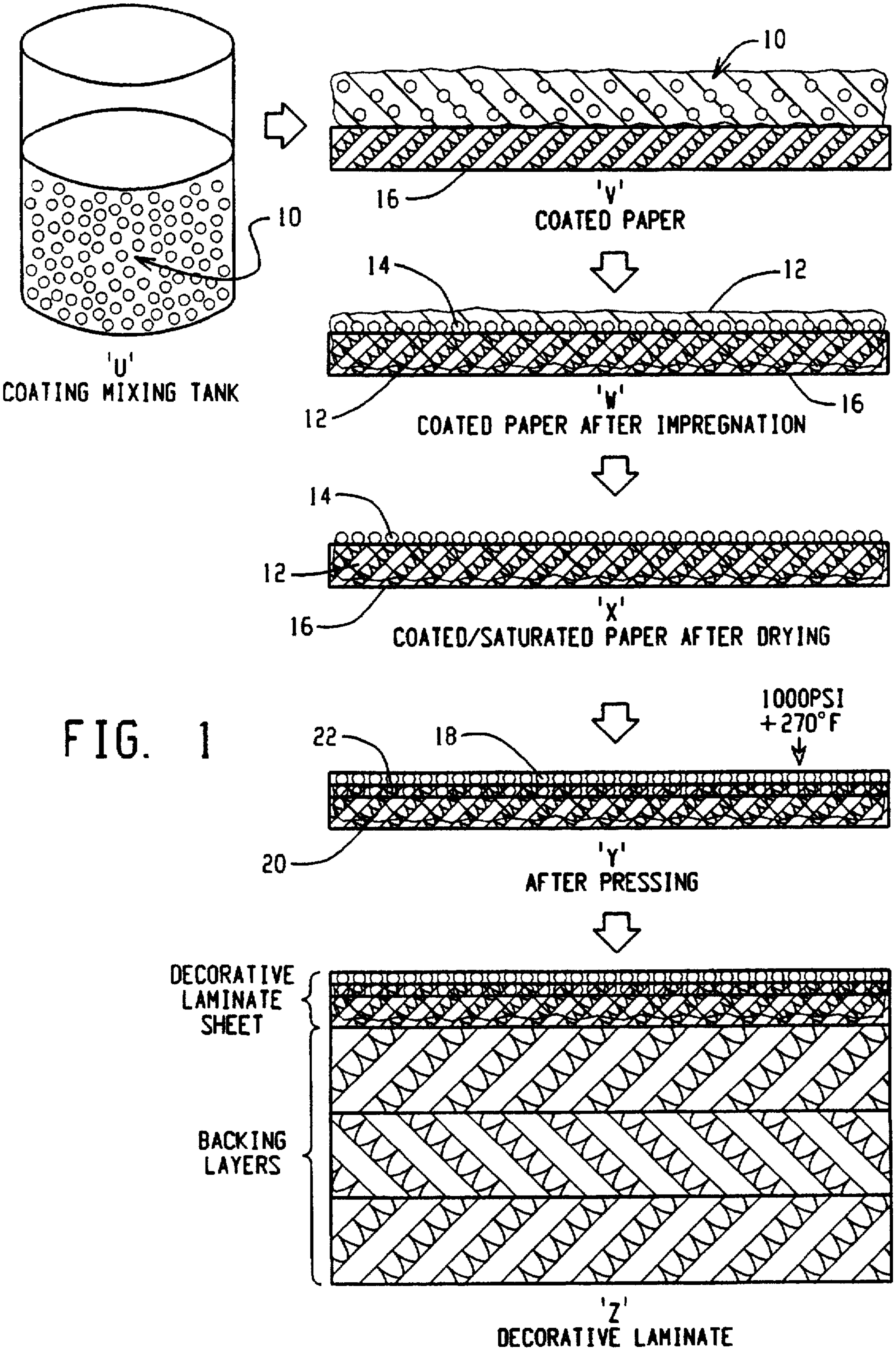
FIG. 1 is a flow chart showing a one step method to achieve the present invention using schematic sectional views of the decorative paper and laminate in accordance with the present invention.

With reference to FIG. 1, a one step process is seen. The coating mix tank (U) contains a dispersion of at least two dissimilar resins (10)—an impregnating resin (12) and a coating resin (14), which will melt and flow under heat and pressure. Coating resin (14) can be a solid particulate or liquid globules insoluble in and dispersed within impregnating resin (12). The dispersion (10) is then coated onto the decorative facing sheet (16) as illustrated by coated sheet (V). Impregnating resin (12) soaks into and impregnates the facing sheet (16) which causes the coating resin (14) to be filtered out onto the exterior surface of the facing sheet (16). The coated sheet after impregnation (W) is then dried in the usual manner resulting in coated paper (X). Dried coated sheet (X) which has become impregnated with impregnating resin (12) has a surface coating of coating resin (14). The dried coated and impregnated sheet (X) is than subjected to the usual laminating conditions to form the decorative laminate sheet (Y) which has substantially two surface layers. These two resin layers include a surface layer (18) consisting essentially of coating resin (14) and a second layer (20) consisting of impregnating resin (12) which is contained almost entirely within the sheet. There is a small interface portion (22) within the sheet which contains both resins (12) and (14). The decorative laminate sheet (Y) is then laminated under heat and pressure to the backing layer to produce the decorative laminate (Z).

It is understood that an impregnating resin is a resin that permeates into the decorative facing sheet material and, when the appropriate backing layer is used, into the backing layer as well. The backing layer for this invention can be any of a number of supporting substrate materials, including layered kraft paper, cardboard,, particle board, fabric (woven, non-woven and felts), mat materials, wood products or other supporting substrate materials as would be dictated by the ultimate use of the final product. The decorative facing sheet suitable for this invention can be one of any number of materials, including paper, foils, fabrics (woven, non-woven and felt materials) or wood products and would depend on the ultimate aesthetic and performance requirements for the finished product.

Figure 2A:
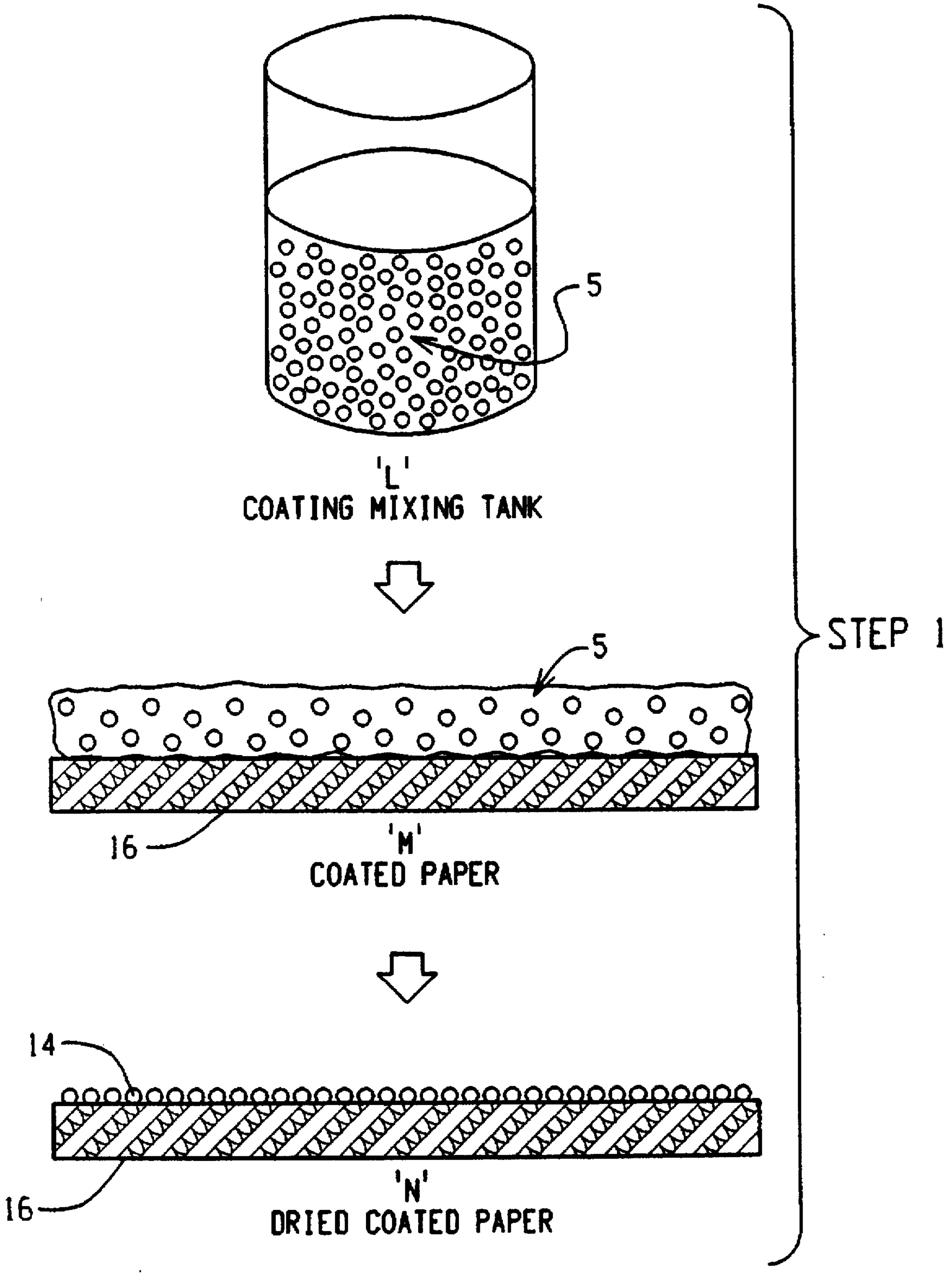
FIG. 2 is a flow chart showing a two step method to achieve the present invention using schematic sectional views of the decorative paper and laminate in accordance with the present invention.
Figure 2B:
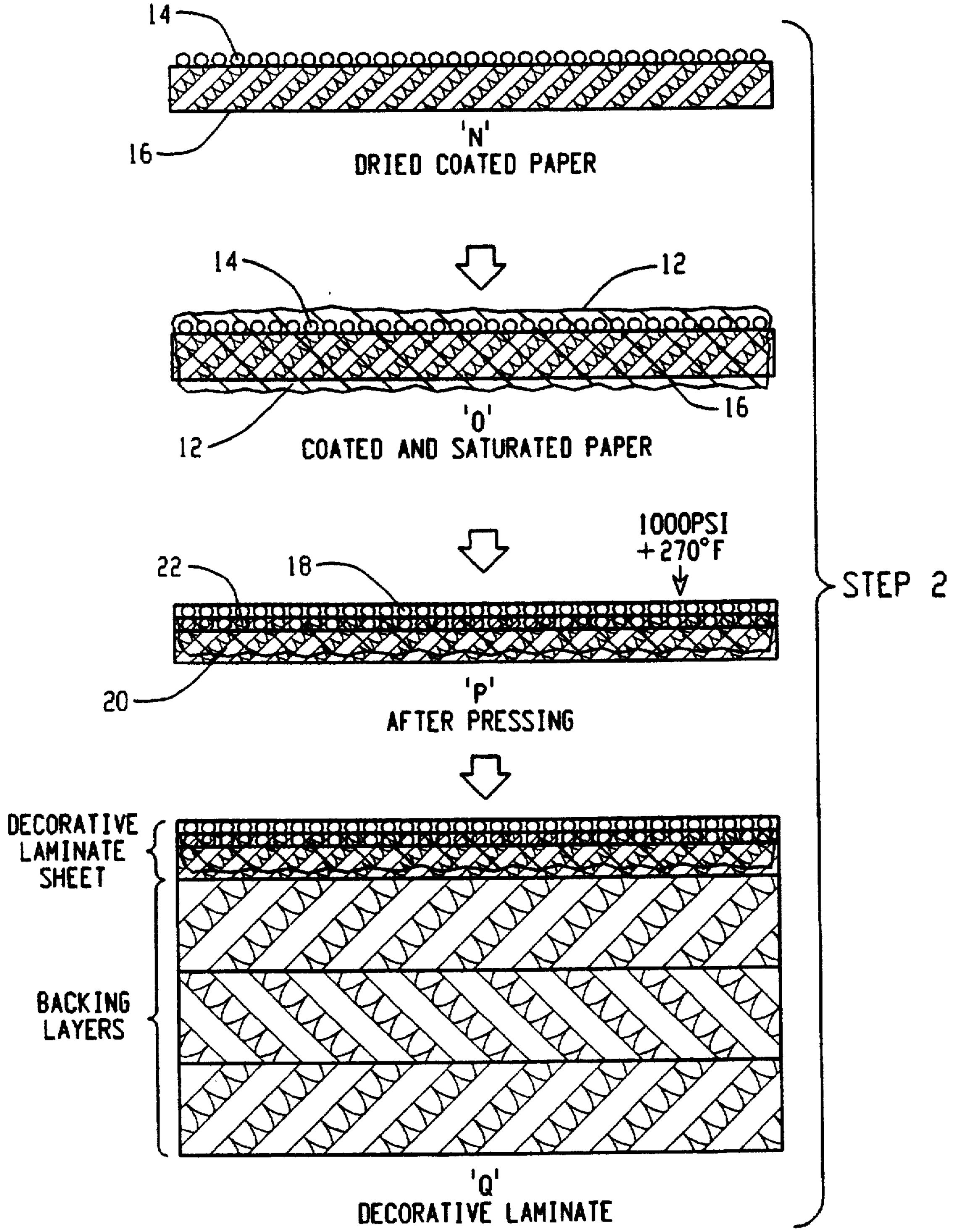

With reference to FIG. 2, the two step process is seen. The coating mixing tank (L) contains a dispersion (5), in an aqueous slurry, of a coating resin (14) which will melt and flow under heat and pressure coating resin (14) can be a solid particulate or liquid globules insoluble in and dispersed within the aqueous slurry. The dispersion (5) is then coated onto the decorative facing sheet (16) as illustrated by coated sheet (M). The facing sheet (16) is then dried in the usual manner to produce dried coated sheet (N). Dried coated sheet (N) is then coated, saturated and impregnated with impregnating resin (12) to form saturated sheet (O) whereupon the impregnated facing sheet is then subjected to normal laminating conditions to produce the decorate laminate sheet (P) which has substantially two surface layers. These two resin layers include a surface layer (18) consisting essentially of coating resin (14) which has substantially displaced impregnating resin (12) on the surface. A second layer (20) consists of impregnating resin (12) which is contained almost entirely within the sheet. There is a small interface portion (22) within the sheet which contains both resins (12) and (14). The decorative laminate sheet (P) is then laminated under heat and pressure to the backing layer to produce the decorative laminate (Q).

Figure 3:
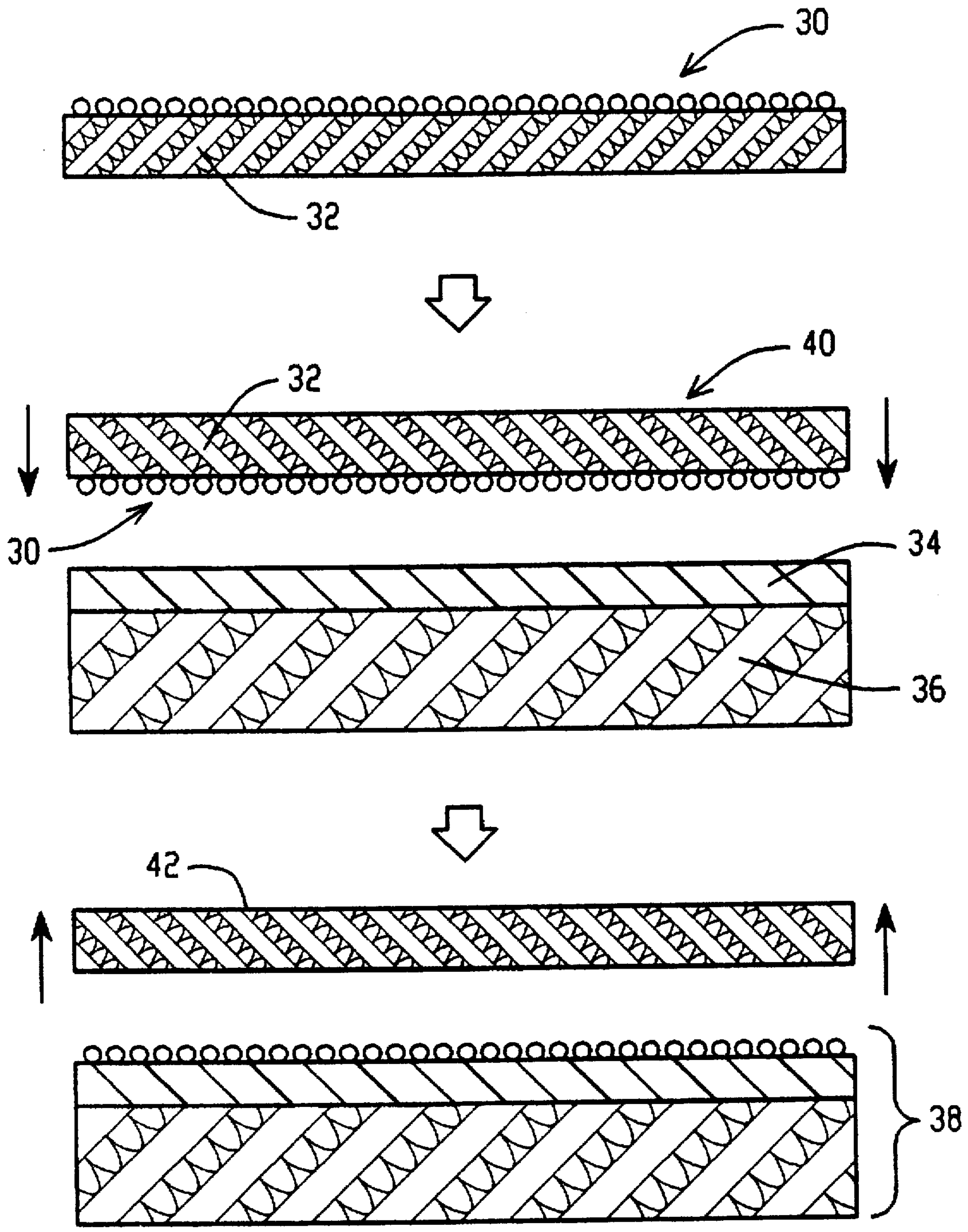
FIG. 3 is a flow chart showing the transfer paper method to achieve the present invention.

In FIG. 3 the transfer sheet process is seen. In this process an aqueous solution containing the surface coating resin particles and a binder (30) is spread onto one side of the transfer or release paper (32) and dried. The coated transfer paper (40) is then placed over the surface of a resin impregnated decorative facing sheet (34), which is on top of the supporting substrate or backing layer (36). The throw away portion (42) of the transfer paper (32) is removed and the layered remaining materials can be used to form a laminate (38). This is usually done as in a high pressure laminating process (about 800 to 1500psi) or a low pressure lamination process which is typically used when the supporting substrate is a particle fiber board or wood substrate. The temperature will vary depending on the resins used and would be readily known by one skilled in this art.

Figure 4:
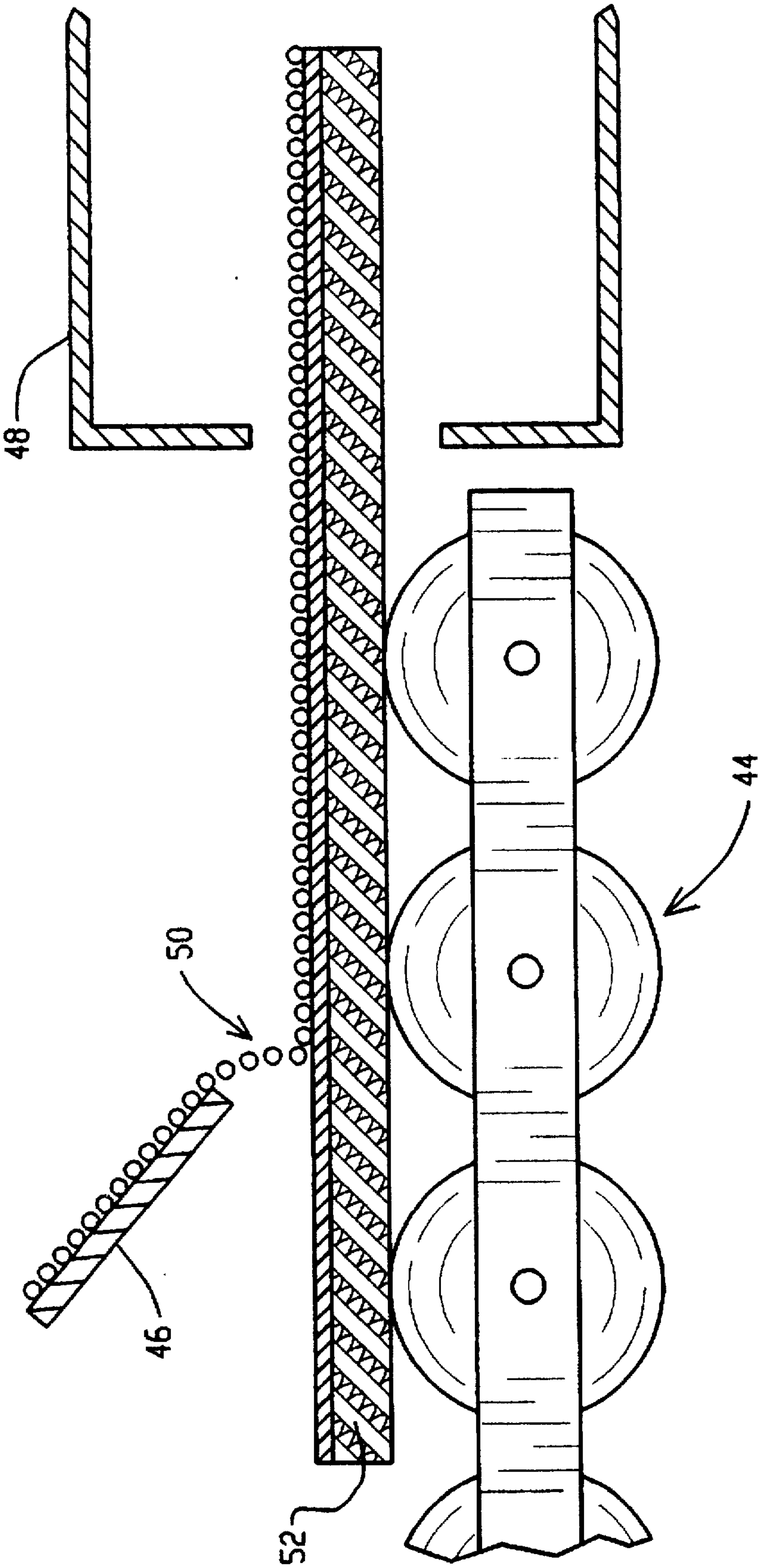
FIG. 4 is a flow chart illustrating a dry powder deposit method of achieving the present invention.

FIG. 4 illustrates another method of achieving the present invention. FIG. 4 shows how the surface coating resin particles (50) are sprinkled via shaker tray (46) over the wet impregnating resin formulation coated on the decorative facing sheet (52). The wet resin decorative facing sheet is being transported along a conveyor system (44) into an oven (48), wherein the surface coating resin particles are secured onto the surface of the facing sheet by drying the wet resin. The decorative facing sheet is then ready to be used on any type of desirable support substrate or backing layer to form a laminate in the conventional way.

Figure 5:
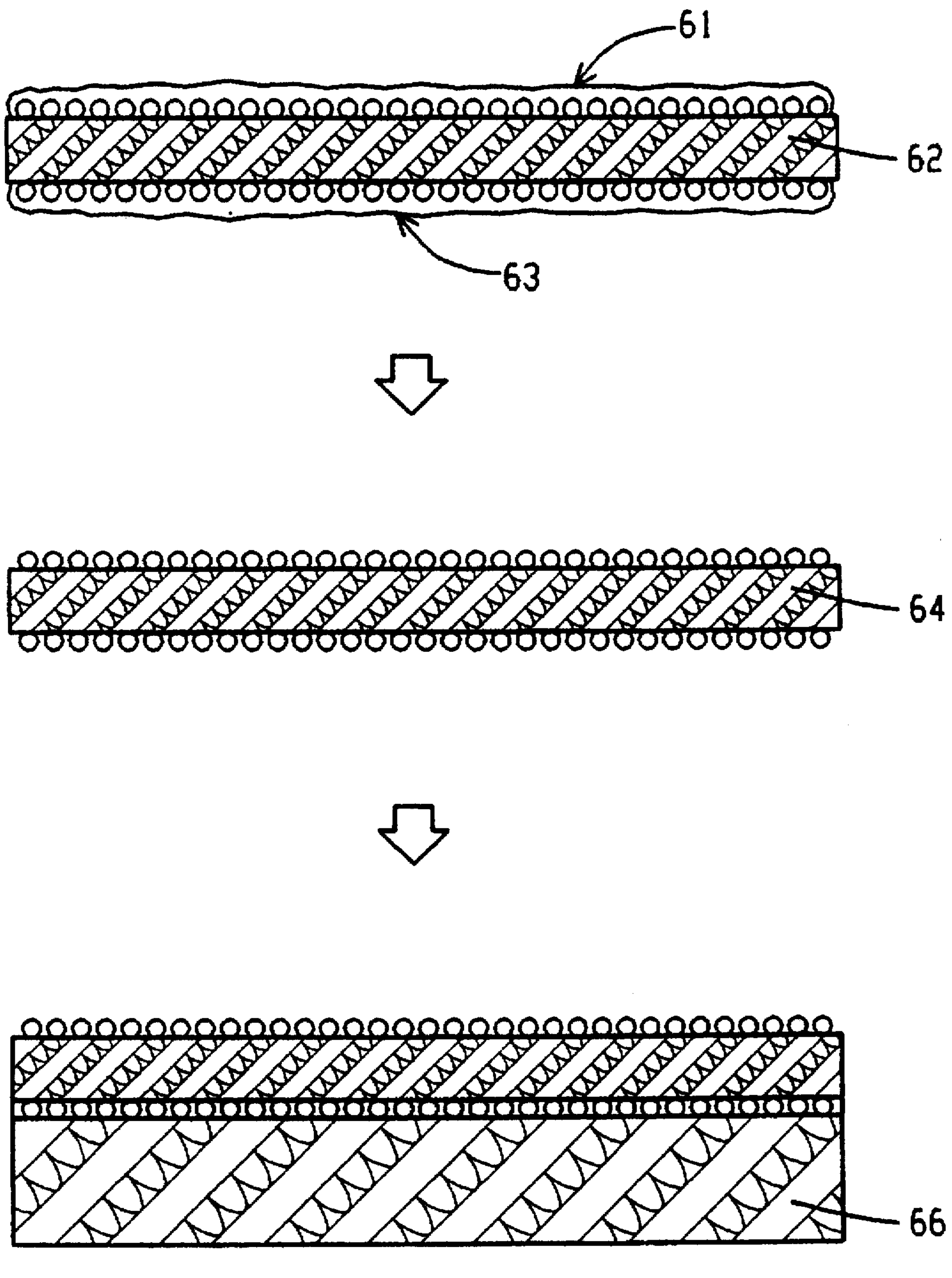
FIG. 5 is a flow chart illustrating a two-sided coating method of achieving the present invention and obtaining an anticurl backing on the decorative sheet.

FIG. 5 illustrates a method of achieving the present invention that also achieves a decorative facing sheet that will not curl during handling. In FIG. 5 a first slurry mixture (61) containing the surface coating resin particles is applied on a first surface of the decorative facing sheet (62) and another slurry mixture containing an impregnating resin (63), that may have the same composition as the first slurry mixture or may have a different composition, is applied to a second surface of the decorative facing sheet (62). The resin coatings are permitted to dry or are dried on the facing sheet (64) in an oven where it is then ready for use in conventional high or low pressure laminating to make a laminate (66) having a supporting substrate or backing layer.

All of the above described processes can be used in high and low pressure laminates and/or for use with transfer foils, wall covering (fabric, paper or non-woven backed), acrylic films, wood veneers, flooring materials and exterior siding materials.

PREFERRED EMBODIMENTS

The product produced in accordance with this invention includes a decorative facing sheet laminated onto the exterior surface of a backing layer and a coating layer that is an integral part of the laminate on the exterior surface of the facing sheet to form an outer surface thereon.

The coating layer is made from at least one particulate polymer resin that melts and flows under heat and pressure and which is dissimilar from the laminate impregnating resin. To achieve a pearlescent appearance, the exterior coating layer should have a refractive index in the finished cured laminate dissimilar from the refractive index of the pearlescent ink on the decorative facing sheet.

Such coating may optionally contain a mixture of an abrasion resistant mineral and a stabilizing suspending agent or binder material for said mineral. The abrasion resistant mineral has a particle size of between 1–200 microns and is present in the mixture in a concentration sufficient to provide abrasion resistance without interfering with visibility.

In a preferred form, the coating layer of this invention includes a mixture of small particles of alumina or other abrasion resistant particles of between about 1–200 micron particle size, polymer particulates of between sub-micron and 250 micron particle size and a lesser amount of micro-crystalline cellulose particles, all dispersed in a stable, aqueous slurry composition. To achieve a pearlescent appearance, the polymer particulates have a refractive index in the finished cured laminate dissimilar to the refractive index of the pearlescent ink on the decorative facing sheet. When using the polymer particulate coating dispersion, the particulates are present in the dispersion such that they melt and flow at the elevated temperatures and pressures of the laminating process.

The particles of alumina or other abrasion resistant particles are of a small size such that they do not interfere with the visual effects in the final product and serve as the abrasion resistant material. The micro-crystalline cellulose particles serve as the preferred temporary binder material or suspending agent. It will be understood that the binder material or suspending agent must be compatible with the impregnating resin later utilized in the laminating procedure, usually melamine resin, or in the case of certain low-pressure laminates, a polyester resin. The micro-crystalline cellulose serves this function as well as stabilizing the small particles of alumina of the surface of the print sheet.

The preferred coating layer composition contains a mixture of small particles of alumina and the polymer particulates and a lesser amount of micro-crystalline cellulose particles, all dispersed in water creating a slurry. There must be an amount sufficient of the binder material or suspending agent, such as a micro-crystalline cellulose, to retain the mineral particles and polymer particulates in place on the surface of the decor facing sheet. The binding material should be able to withstand the subsequent laminating conditions. In general, it has been found that satisfactory results are attained with about 5 to 10 parts by weight of the micro-crystalline cellulose for about 20–120 parts by weight of the alumina and polymer particulate. However, it is possible to work outside this range. The quantity of water in the slurry is also dictated by practical considerations, since if there is too little water, the slurry becomes so thick that it is hard to apply. Similarly, if there is too much water, the slurry becomes so thin that it is difficult to maintain a consistent thickness during the coating operation due to running of the slurry. Thus, a slurry containing about 2.0 wt % micro-crystalline cellulose and about 24 wt % alumina and polymer particulates, based on the amount of water, is stable, i.e., the alumina does not settle out; but if more than about 3.5 wt % micro-crystalline cellulose and about 24 wt % alumina and polymer particulates, based on the amount of water, is used, the slurry becomes very thixotropic and difficult to apply.

The slurry composition also preferably contains a small amount of wetting agent, preferably a non-ionic wetting agent, and a silane. The quantity of wetting agent is not critical, but only a very small amount is desirable and excess quantities provide no advantage and can cause disadvantages during processing. The silane acts as a coupling agent which chemically binds the alumina or other inorganic particles to the melamine matrix after impregnation and curing. The use of silane provides better initial wear since the alumina particles are chemically bound to the melamine in addition to being mechanically bound thereto and therefore stay in place longer under abrasive wear. The particular silane used should be selected from among the group making it compatible with the particular laminating resin used. (See the 1976–77 Edition of Modern Plastics Encyclopedia, Page 160, which lists some silanes useful with melamine and polyester systems.) In this regard, silanes having an amino group, such as gamma-aminopropyltrimethoxy silane, are particularly effective for use with melamine resins.

The quantity of silane used need not be great and, in fact, as little as 0.5% based on the weight of the alumina is effective to enhance the abrasion resistance of the final laminate. A maximum quantity of about 2% by weight based on the weight of the alumina or other particles is suggested since greater quantities do not lead to any significantly better results and merely increase the cost of the raw materials. The decorative paper is then impregnated in the normal manner with a suitable laminating resin, usually a thermosetting resin.

The polymer particulates can be selected from any of the traditional laminating resins. Enhanced wearability, chemical, thermal, resistance to ultra-violet radiation, and resistance to abrasion is possible by selecting the appropriate coating resin for a specific property. For instance, a vinylester may be selected if a high resistance to mineral acids and mineral basis is desired. An acrylic may be selected for ultra-violet radiation stability. An epoxy may be selected if thermal resistance is desired and for a high chemical and stain resistance properties. In order to achieve the brilliant visual pearlescent effect, it is important to select a resin having a refractive index in the finished cured laminate dissimilar from the refractive index of the pearlescent ink on the decorative facing sheet being used. The selection of polymer particulates is preferably made from the group consisting of polyester, polyurethane, epoxy, polyvinyl chloride and acrylic, or mixtures thereof. In addition to alumina, abrasion resistant particles may be mineral particles such as silica, zicronum oxide, cerium oxide, glass beads and diamond dust or mixtures thereof.

Another preferred method for achieving the objects of this invention is by the process of depositing on the surface of a decor sheet a liquid dispersion of dissimilar resins or layer of polymer particulates simultaneously with the complete resin saturation of the decor sheet in a single step operation, in which the resin may optionally act as a carrier for the abrasion resistant material.

This process by which the present invention is achieved is best described as follows:

(a) preparing a coating dispersion of at least two dissimilar resins, wherein the first of said dissimilar resins is an impregnating resin and wherein the second of said dissimilar resin is the surface coating resin which melts and flows under heat and pressure, and a binder material that can retain the second dissimilar resin on the exterior facing surface of the decorative facing sheet and that is compatible with said impregnating resin and that will withstand subsequent laminating conditions;

(b) coating and impregnating an unsaturated decorative facing sheet in at least one step by coating said coating dispersion over the exterior facing surface of said sheet at a rate such that said unsaturated sheet becomes substantially saturated with said impregnating resin, and the second dissimilar resin is filtered onto said facing surface; and (c) drying said coated and impregnated decorative sheet to obtain a decorative sheet suitable for pressing.

Optionally, a hard mineral of fine particle size in a concentration sufficient to provide abrasion resistant layer without interfering with visibility may be added to the coating mixture. The use of small, hard mineral particles to provide abrasion resistance without interfering with visibility is well known in the art and the subject matter pertaining to such particles, as disclosed in U.S. Pat. Nos. 4,255,480, 4,713,138, and Re. 32,152 is hereby incorporated by reference. The hard mineral that may be used in the coating composition is of fine particle size, preferably between about 1–200 microns, and used in quantities sufficient to provide an abrasion resistant layer without interfering with visibility. The hard mineral is preferably alumina, silica, zirconium oxide, cerium oxide, glass beads, and diamond dust or mixtures thereof. When using a hard mineral in the coating mixture, a binding material or suspending agent for such mineral may be necessary to retain the mineral particle on the exterior surface of the decorative facing sheet. The binder material or suspending agent should have the properties of being able to withstand the subsequent laminating conditions and wherein said binding material or suspending agent is compatible with the impregnating resin. Such binding material or suspending agent is used in an amount sufficient to bind the abrasion resistant mineral to the surface of the decor sheet.

The dissimilar resins may be either in liquid or particulate form. The coating resin that must melt and flow under heat and pressure in (a) above are selected from the group consisting of polyester, polyurethane, epoxy, polyvinyl chloride, and acrylic, or mixtures thereof. It is understood by the expression "melt and flow" that many liquid materials need no further melting in order to flow sufficiently. In order to achieve the brilliant visual pearlescent effect, it is important that the coating resin be a resin having a refractive index in the finished cured laminate dissimilar from the refractive index of the pearlescent ink on the decorative facing sheet being used.

The binding material or suspending agent is preferably a mixture of micro-crystalline cellulose with a minor amount of carboxy methyl cellulose; "AVICEU" is sold as a mixture of approximately 89% micro-crystalline cellulose and 11% carboxy methyl cellulose. The coating composition suitably contains 1–8 parts by weight of "AVICEL" to 4–32 parts by weight of the combination of the mineral particles and polymer particulates preferably at a ratio of mineral particles to binding material or suspending agent of 4:1 to 1:2, and a quantity of 1 part of "AVICEL" per 2 parts of mineral particles has been found to be particularly suitable. It is also possible to add small additional quantities of carboxy methyl cellulose (or none whatsoever) and a small quantity of silane as binder materials. It is preferable to include a small quantity of surfactant, as disclosed in U.S. Pat. No. 4,255,480, and a small quantity of solid lubricant to provide scuff resistant, as disclosed in U.S. Pat. No. 4,567,087.

There are six important variables in the formulation, three of which are independent and three of which are dependent. The data presented in Table 1, below, helps define the parameters. Decor paper weight, resin content and weight of the abrasion resistant composition are all independent of the formulation. The requirements for these variables are set by outside factors such as color, degree of final saturation, and abrasion resistance. Resin weight (dry) per ream is dependent on a combination of paper basis weight and desired resin content. Viscosity is dependent on the total volume of the mixture versus the content of abrasion-resistant composition. For complete saturation of the decor paper at the coater, the mixture viscosity should be less than 1000 centipoise for porous paper, preferably in the range of 50–100 centipoise depending on paper porosity.

TABLE I

Coating Variable Comparison
For Coated/Saturated Decor Papers

| | 65 lb. Solid | 80 lb. Solid | 65 lb. Printed |
|---|---|---|---|
| Total % Add On (resin content) | 52% | 52% | 52% |
| Volatile Content (approximate) | 6% | 6% | 6% |
| Primary Resin (melamine) | 61 lbs. | 75 lbs. | 61 lbs. |
| Secondary Resin (polyester) | 2 lbs. | 2 lbs. | 2 lbs. |
| Suspending Agent (Avicel) | 0.7 lbs. | 0.7 lbs. | 1.7 lbs. |
| Mold Release (Infernol) | 0.01 lbs. | 0.02 lbs. | 0.01 lbs. |
| Anti Foam Surfactant | 0.04 lbs. | 0.05 lbs. | 0.04 lbs. |
| Catalyst (Naccure) | 0.09 lbs. | 0.11 lbs. | 0.09 lbs. |
| Abrasion Resistant Mineral ($Al_2O_3$) | 2.00 lbs. | 2.00 lbs. | 5.00 lbs. |

TABLE I-continued

| Coating Variable Comparison For Coated/Saturated Decor Papers | 65 lb. Solid | 80 lb. Solid | 65 lb. Printed |
|---|---|---|---|
| Total Coat Weight per 3000 sq. ft. | 65.21 lbs. | 78.08 lbs. | 69.54 lbs. |
| Viscosity of formula required for good saturation | 50–100 cps | 80–100 cps | 50–100 cps |
| Approximate viscosity prior to addition of water | 400 cps | 300 cps | 1800 cps |
| Approximate water added to Reduce to 50–100 cps | 75 lbs. | 60 lbs. | 90 lbs. |

From Table I above, it will be noted that the higher the basis weight of the decor paper, a greater volume of liquid resin is required. This yields a corresponding lower final viscosity on the 80 pound paper coating as compared to the 65 pounds paper coating.

One preferred embodiment of the present invention uses finely ground particulates of polyester resin applied at a rate about two pounds per ream of decorative laminate facing sheet. Either thermoplastic or thermoset resins may be used and the selection of which, depends on the final physical or chemical properties desired. Other embodiments include the use of polymer particulates made from polyurethane, epoxy, polyvinyl chloride, melamine and acrylic resins, or mixtures thereof in a melamine or a polyester resin. It is also possible to apply the coating resin in an amount as low as one pound per ream and as high as sixty pounds per ream of decorative laminate facing sheet.

The following examples are offered illustratively:

EXAMPLE I

This example illustrates one method and composition that achieves a pearlescent appearance on a laminate surface. Warm 150 gal. melamine resin at 100° F. ±5° F. is placed in a container under a low shear mixer. The melamine has a density of 1.15 and 37.7% solids. TRITON CF21 surfactant in an amount of 0.001 part by weight is added per 192.8 lbs. of liquid resin. Mixing is continued at a high speed for 5 minutes. 9.86 lbs of AVICEL and 0.87 lbs Emerest 2652 (anti-foam) are rapidly added in a manner as to avoid clumping or the formation of lumps. Immediately thereafter 38.76 lbs of polyester particulates made from the Morton 23-9036 and 24.66 lbs of 45 alumina are added rapidly and completely in less than three minutes.

The viscosity is measured and 70 gal. of water is added to provide a viscosity of no greater than 150 centipoise (Brookfield viscometer #3, spindle at 12 rpm).

Printed decor paper weighing 65 lbs/ream is coated with the composition at the rate of 196.1 lbs/ream. This gives an approximate 2 lbs/ream coating of the polyester resin. A ream of paper in the present field is 3,000 $ft^2$. The paper is dried at an elevated temperature and is ready for use in the manufacture of laminates. The laminate was prepared in the usual practice.

EXAMPLES II, III, IV and V

Example I was followed above using 35.2 lbs of Glidden 2C-114 (epoxy), 4C-104 (acrylic), 5C-104 (polyester) and Morton Polyester 23-9036 in the following mixtures:

| Batch Formulations | II | III | IV | V |
|---|---|---|---|---|
| Melamine resin (liquid) 63% solids | 150 gal. | 150 gal. | 150 gal. | 150 gal. |
| Water | 70 gal. | 70 gal. | 70 gal. | 70 gal. |
| Emerest 2652 Surfactant | 3.5 lbs. | 3.5 lbs. | 3.5 lbs. | 3.5 lbs. |
| Avicel | 11.0 lbs. | 11.0 lbs. | 11.0 lbs. | 11.0 lbs. |
| Aluminum oxide, 40 micron | 70.5 lbs. | 70.5 lbs. | 70.5 lbs. | 70.5 lbs. |
| Mold release (Infernol) | 1 lbs. | 1 lbs. | 1 lbs. | 1 lbs. |
| Marton polyester 23-9036 | 35.2 lbs. | — | — | — |
| Glidden polyester 5C-104 | — | 35.2 lbs. | — | — |
| Glidden acrylic 4C-104 | — | — | 35.2 lbs. | — |
| Glidden epoxy 2C-114 | — | — | — | 35.2 lbs. |

The following table illustrates by comparison how well the present invention achieves the international standards for horizontal laminate surfaces while retaining brilliant visual effects.

Pearlescent Printed Paper Typical Values

| NEMA Test Methods | NEMA Standard | No Overlay | With Overlay | Composition A |
|---|---|---|---|---|
| Wear value | 400 cycles/min. | 25 c/m | 450 c/m | 825 c/m |
| High-temp resistance | Slight | NE | NE | NE |
| Hot water | NE* | NE | NE | NE |
| Dimensional change | .5 MD/.9 CD | .06/.69 | .06/.69 | .06/.69 |
| Impact | 50 in. min. | 66 in. | 66 in. | 66 in. |
| Conductive heat | NE | NE | NE | NE |
| Cigarette resistance | 125 min. | 220 min. | 220 min. | 220 min. |
| Light Stability | Slight | NE | NE | NE |
| Stain | NE: 1–23/Mod: 24–29 | NE | NE | NE |
| Scuff resistance | NE | Severe | NE | NE |

-continued

| | | Pearlescent Printed Paper Typical Values | | |
|---|---|---|---|---|
| NEMA Test Methods | NEMA Standard | No Overlay | With Overlay | Composition A |
| Visual appearance | — | Bright-Excellent Pearlescent appearance | Dull-No Visual Bright | Bright-Excellent Pearlescent appearance |

*NE = No effect
"No Overlay" is a melamine surface alone.
"With Overlay" is a standard construction of an alpha-cellulose paper impregnated with melamine on the surface of the laminate.

This comparative test illustrates the advantages of the present invention. The pearlescent printed paper without a protective overlay has a desirable appearance but lacks required durability. The standard construction with an overlay has desirable durability but lacks the brilliant pearlescent appearance.

It is only with the present invention, Composition A, that both the desired durability characteristics is achieved in a laminate having a brilliant pearlescent appearance.

EXAMPLE VI

The following coating surface dispersion formula is used in the two step laminate process wherein a surface coating dispersion is applied to the exterior surface of the decorative facing sheet which has been applied into the exterior side of the backing layer. After each decorative facing sheet was coated with the surface coating mixture, the coated decorative sheet was dried in the usual manner whereupon the coated decorative sheet was saturated with melamine thermosetting resin and pressed to form the laminate.

| Coating Surf ace Batch Formulation | |
|---|---|
| Cold Water | 417 grams |
| CMC-7M | 2.5 grams |
| AVICEL | 7.5 grams |
| Alumina particulates, 20 microns | 30 grams |
| Morton Polyester 23-9036 | 30 grams |
| Ultraviolet tracer PWA @100% | 0.28 grams |
| Acetic Acid @5.6% | 0.95 grams |
| Formaldehyde @37% | 0.28 grams |

| Woodgrain-1 | US20* (3.5 lbs/ream) | US40* (7.0 lbs/ream) |
|---|---|---|
| Initial Point | 50 | 50 |
| Final Point | 175 | 350 |
| Wear Value | 173 | 200 |

-continued

| Coating Surf ace Batch Formulation | | |
|---|---|---|
| Woodgrain-2 | US20 (3.5 lbs/ream) | US40 (7.0 lbs/ream) |
| Initial Point | 125 | 50 |
| Final Point | 200 | 275 |
| Wear Value | 163 | 163 |
| Woodgrain-3 | US80* (14.3 lb/ream) | US90* (15.5 lb/ream) |
| Initial Point | 100 | 125 |
| Final Point | 500 | 525 |
| Wear Value | 300 | 325 |
| Rate of Wear | 0.036 grams | 0.037 grams |

*Mayer Bar Coating Technique. It is understood by those skilled in the art that this is a technique to vary coating weight.

EXAMPLES VII–IX

The Coating Surface Batch Formulation provided in Example VI can be prepared substituting the 30 grams of Morton Polyester 23-9036 with the polymer particulates made from the following resins:

| | | |
|---|---|---|
| Example VII | 30 grams | Glidden Polyester 5C-104 |
| Example VIII | 30 grams | Glidden Acrylic 4C-104 |
| Example IX | 30 grams | Glidden Epoxy 2C-114 |

EXAMPLES X–XVI

Additional coating surface mixture formulas are possible. Using the method as explained in Example I, above, the components may be mixed as follows:

| | 65 lb/ream paper | | | | | |
|---|---|---|---|---|---|---|
| | Impregnating Resin | Polymer Particulate | Surfactant | Anti-foam | Mineral Particulate | Diluent* |
| X. | Polyester 61 lbs. (dry) | Epoxy 2 lbs. (dry) | 0.01 lbs. | 0.04 lbs. | 5.0 lbs. | as required |
| XI. | Polyester 61 lbs. (dry) | PVC 2 lbs. (dry) | 0.01 lbs. | 0.04 lbs. | 5.0 lbs. | as required |

-continued

| | Impregnating Resin | Polymer Particulate | Surfactant | Anti-foam | Mineral Particulate | Diluent* |
|---|---|---|---|---|---|---|
| | 65 lb/ream paper | | | | | |
| XII. | Polyester 61 lbs. (dry) | Acrylic 2 lbs. (dry) | 0.01 lbs. | 0.04 lbs. | 5.0 lbs. | as required |
| XIII. | Acrylic 61 lbs. (dry) | Polyurethane 2 lbs. (dry) | 0.01 lbs. | 0.04 lbs. | 5.0 lbs. | as required |
| IVX. | Polyester 61 lbs. (liquid @ 100% solids) | Polyester 2 lbs. (dry) | 0.01 lbs. | 0.04 lbs. | 5.0 lbs. | as required |
| XV. | Melamine 61 lbs. (dry) | Polyester 1 lb. (dry) | 0.01 lbs. | 0.04 lbs. | 5.0 lbs. | as required |
| XVI. | Melamine 61 lbs. (dry) | Polyester 10 lbs. (dry) | 0.01 lbs. | 0.04 lbs. | 5.0 lbs. | as required |

*It may also be desirable to use a suspending or binding agent such as a film forming binder microcrystalline cellulose, hydroxyethyl cellulose, carboxy methyl cellulose or polyvinyl pyrrolidone in quantities of from approximately 1 lb. to 5 lbs. as needed.

EXAMPLE XVII

Any of the resin mixtures provided in Examples I through XVI could be used in a low pressure laminate for a particle broad backing layer. A low pressure laminate would be formed using approximately 1 to 2 minute press cycles at approximately 150 to 400 psi and at a platen temperature of about 350° to 400° F. In a low pressure laminate, the polymer particulate may be a reactive resin, for example a polyester with a blocked isocyanate such as MONDUR or an acrylic with a blocked isocyanate or peroxide catalyst.

EXAMPLES XVIII–XXIII

The following coating slurries may be used in the methods illustrated in FIGS. 3.

| | Polymer Particulate | Surfactant | Anti-foam | Mineral Particulate | Diluent | Binder |
|---|---|---|---|---|---|---|
| XVIII | Epoxy 2 lbs. (dry) | 0.01 lbs. | 0.04 lbs. | 0.0 lbs. | 100 lbs. water | 5 lbs. CMC* |
| XIX | PVC 2 lbs. (dry) | 0.01 lbs. | 0.04 lbs. | 5.0 lbs. | 100 lbs. water | 5 lbs. CMC |
| XX | Polyester 2 lbs. (dry) | 0.01 lbs. | 0.04 lbs. | 5.0 lbs. | 100 lbs. water | 5 lbs. CMC & 2 lbs. Avicel |
| XXI | Polyurethane 2 lbs. (dry) | 0.01 lbs. | 0.04 lbs. | 5.0 lbs. | 100 lbs. toluene | 6 lbs. urethane |
| XXII | Polyester 45 lbs. (dry) | 10 lbs. | 1.0 lbs. | 5.0 lbs. | 100 lbs. water | 5 lbs. melamine 5 lbs. HEC** |

-continued

| | Polymer Particulate | Surfactant | Anti-foam | Mineral Particulate | Diluent | Binder |
|---|---|---|---|---|---|---|
| XXIII | Acrylic 2 lbs. (dry) | 0.01 lbs. | 0.04 lbs. | 5.0 lbs. | 100 lbs. water | 2 lbs. melamine resin & 5 lbs. PVP*** |

CMC = carboxy methyl cellulose
**HEC = hydroxyethyl cellulose
***PVP = polyvinyl pyroladone

EXAMPLE XXIV

A damage resistant coated decorative facing sheet can be created by increasing the content of the substantially uncured resin in Examples XVIII through XXIII to more than 2 lbs., preferably more than 10 lbs., and most preferably to about 45 to 60 lbs. In Examples VI–IX, the quantity of the polymer particulate can be increased to 300 grams and more preferably to 600–900 grams to achieve a damage resistant coated decorative facing sheet. By increasing the weight of particulate resin used, the sheet can be flexed without resulting in damage, thereby decreasing waste in production operations. A laminate can then be formed from the facing sheet without a deleterious affect in the final product. While it may be possible to achieve a damage resistant coated decorative facing sheet using any method of the present invention, it is preferably achieved using the Two Step Coating and Drying Process and the Transfer Sheet Process illustrated in FIGS. 2 and 3, respectively.

EXAMPLE XXV

A damage resistant coated decorative paper can be created by increasing the content of the surface coating particulate resin in Examples I through XIV to a higher level and decreasing the content of the impregnating resin up to zero pounds. When the impregnating resin content is reduced and the surface coating particulate resin content increased, the polymer particulate will act as both the surface coating resin that melts and flows under heat and pressure and the impregnating resin.

The laminate can be prepared in the usual way.

EXAMPLE XXVI

When using the methods described in FIG. 5 the resin coating formulas for the one step process provided in Examples II–V and Examples X–XVI can be used for coating both sides of the decorative facing sheet. Furthermore, when using the two sided coating of FIG. 5, the resin coating formulas of Examples II–V and VII–XIII would be used as the top coating (61). Back coating (63) may be the same formulation without the aluminum oxide.

EXAMPLE XXVII

When using the dry coating method illustrated in FIG. 4, the particle resin can be applied at an application rate of 0.5 lb./ream up to 20 lb./ream. The particle resin that can melt and flow under heat and pressure can be selected from the group consisting essentially of polyester, melamine, acrylic, polyvinyl chloride, epoxy, polyurethane and mixtures of two or more of the foregoing.

The formulation for the impregnating resin composition that is coated on the decorative facing sheet (42) can be formulated to meet the aethestic, chemical and physical demands of the final products. For example, the formulation provided in Examples I–XVI, without the polymer particulate, is such a suitable formulation.

What is claimed is:

1. A decorative laminate comprising:

a core backing layer serving as a supporting layer;

a decorative facing sheet having a first exterior surface laminated to said backing layer and an opposing exterior surface; and a coating including at least two dissimilar resins applied on the opposing exterior surface of said decorative facing sheet prior to laminating said facing sheet to said backing layer, one of said resins being a liquid impregnating resin and another of said resins being a particulate surface coating resin that melts and flows under heat and pressure during lamination to form a laminate surface having an ultra-thin surface layer consisting essentially of the surface coating resin and having one or more of the following properties, enhanced wearability, chemical, thermal, ultraviolet radiation resistance or abrasion resistance.

2. A decorative laminate in accordance with claim 1, wherein said surface coating resin is selected from the group consisting essentially of polyester, polyurethane, epoxy, polyvinyl chloride, acrylic, and mixtures of two or more of the foregoing.

3. A decorative laminate in accordance with claim 1, wherein the impregnating resin is a liquid melamine resin.

4. A decorative laminate in accordance with claim 1, wherein said coating further includes a mixture of an abrasion resistant hard mineral having a particle size of between about 1–200 microns in a concentration sufficient to provide abrasion resistance without interfering with visibility.

5. A decorative laminate in accordance with claim 4, wherein said abrasion resistant hard mineral is selected from the group consisting essentially of alumina, silica, zirconium oxide, cerium oxide, glass beads, diamond dust and mixtures of two or more of the foregoing.

6. A decorative laminate in accordance with claim 4, wherein said abrasion resistant mineral is alumina and wherein said alumina is chemically bound to said impregnating resin with silane.

7. A decorative laminate comprising:

a core backing layer;

a decorative facing sheet having a first exterior surface laminated to said backing layer and having a pearlescent ink on a second exterior surface; and a coating including at least two dissimilar resins applied on the second exterior surface of said decorative facing sheet prior to laminating said facing sheet to said backing layer, one of said resins being a liquid impregnating resin and another of said resins being a particulate surface coating resin that melts and flows under heat and pressure during lamination, to form a laminate surface having an ultra-thin surface layer consisting essentially of the surface coating resin, said surface coating resin having a refractive index in the cured laminate dissimilar from the refractive index of the pearlescent ink on the facing sheet to form a laminate having a pearlescent appearance.

8. A decorative laminate in accordance with claim 7, wherein said surface coating resin is selected from the group consisting essentially of polyester, polyurethane, epoxy, polyvinyl chloride, acrylic, and mixtures of two or more of the foregoing.

9. A decorative laminate in accordance with claim 7, wherein the impregnating resin is a liquid melamine resin.

10. A decorative laminate in accordance with claim 7, wherein said coating further includes a mixture of an abrasion resistant hard mineral having a particle size of between about 1–200 microns in a concentration sufficient to provide abrasion resistance without interfering with visibility.

11. A decorative laminate in accordance with claim 10, wherein said abrasion resistant hard mineral is selected from the group consisting essentially of alumina, silica, zirconium oxide, cerium oxide, glass beads, diamond dust and mixtures of two or more of the foregoing.

12. A decorative laminate in accordance with claim 10, wherein said abrasion resistant mineral is alumina and wherein said alumina is chemically bound to said impregnating resin with a silane.

13. A decorative laminate sheet for use in the preparation of decorative laminates, comprising:

a decorative facing sheet, and a coating applied to said facing sheet, said coating including at least two dissimilar resins, one of said resins being a liquid impregnating resin and another of said resins being a particulate surface coating resin that melts and flows under heat and pressure applied to the decorative facing sheet to form a decorative laminate sheet having an ultra-thin surface layer consisting essentially of the surface coating resin and having one or more of the following properties, enhanced wearability, chemical, thermal, ultra-violet radiation resistance or abrasion resistance.

14. A decorative laminate sheet in accordance with claim 13, wherein said surface coating resin is selected from the group consisting essentially of polyester, polyurethane, epoxy, polyvinyl chloride, acrylic, and mixtures of two or more of the foregoing.

15. A decorative laminate sheet in accordance with claim 13, wherein said surface coating further includes a mixture of an abrasion resistant hard mineral having a particle size of between about 1–200 microns in a concentration sufficient to provide abrasion resistance without interfering with visibility.

16. A decorative laminate sheet in accordance with claim 15, wherein said abrasion resistant hard mineral is selected from the group consisting essentially of alumina, silica, zirconium oxide, cerium oxide, glass beads, diamond dust and mixtures of two or more of the foregoing.

17. A decorative laminate sheet in accordance with claim 15, wherein said abrasion resistant mineral is alumina and wherein said alumina is chemically bound to said impregnating resin with silane.

18. A decorative facing sheet in accordance with claim 13, wherein the impregnating resin is a liquid melamine resin.

19. A decorative laminate produced from the decorative laminate sheet of claim 13, wherein the decorative laminate sheet is laminated to a backing layer under heat and pressure.

* * * * *